United States Patent Office 2,813,883
Patented Nov. 19, 1957

2,813,883

9α-HALO-17β-HYDROXY-17α-METHYL-ANDROSTANE-3,11-DIONES

Milton E. Herr, Kalamazoo, Mich., assignor to The Upjohn Company, Kalamazoo, Mich., a corporation of Michigan No Drawing. Application March 19, 1956,
Serial No. 572,211

7 Claims. (Cl. 260—397.45)

This invention pertains to organic compounds of the androstane series and is more particularly concerned with novel 9α-halo - 17β - hydroxy-17α-methylandrostane-3,11-diones of the formula

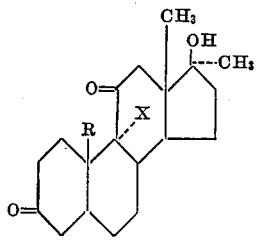

wherein R is selected from hydrogen and methyl and X is a halogen atom having an atomic weight from nineteen to 127, i. e. fluorine, chlorine, bromine and iodine. Preferably X is a halogen atom having an atomic weight from nineteen to 36, i. e. fluorine and chlorine, fluorine being preferred. It is to be understood that the configuration of the 5-hydrogen atom can be α or β and that both forms are included within the scope of the present invention. This application is a continuation-in-part of copending application Serial No. 550,824, filed December 5, 1955, now abandoned.

It is an object of this invention to provide the 9α-halo-17β - hydroxy - 17α - methylandrostane-3,11-diones of the above formula. Said compounds are potent anabolic and androgenic agents and are used in place of prior anabolic and androgenic agents in known anabolic and androgenic pharmaceutical preparations. The compounds also have hypotensive, anti-pituitary, central nervous system depressant, and anti-estrogen activity, and are employed in place of known agents in pharmaceutical formulations used for such purposes. Other objects and uses will be apparent to one skilled in the art.

The 9α - halo-17β-hydroxy-17α-methylandrostane-3,11-diones of the above formula are also useful in the form of their 17-monoacylate. Their acylate, e. g., acetate, propionate, trimethylacetate, α or β-cyclopentylpropionate, α or β-cyclohexylpropionate, benzoate, phenylacetate, cyclohexylacetate, α or β-phenylpropionate, or other hydrocarbon carboxylate, preferably containing from one to nine carbon atoms, inclusive, are useful for the same purposes as the parent compounds, and in addition these esters are useful for the purification of the parent 9α-halo-17β-hydroxy-17α-methylandrostane-3,11-diones.

The 9α - halo-17β-hydroxy-17α-methylandrostane-3,11-diones of the present invention can be prepared readily from the corresponding 9α-halo-11β,17β-dihydroxy-17α-methylandrostane-3-ones (starting compounds are described in copending applications Serial No. 550,846, filed December 5, 1955, now abandoned, and Serial No. 572,232, filed March 19, 1956) by oxidation of the 11β-hydroxy group to an 11-keto group. The oxidation can be carried out using the preferred chromic acid, potassium permanganate, potassium dichromate, N-bromoacetamide, N-chlorosuccinimide, tertiary-butyl hypochlorite, or other oxidizing agent, preferably using a solvent, e. g., acetic acid or chloroform with chromic acid, tertiary-butyl alcohol with N-bromoacetamide, N-chlorosuccinimide, or tertiary-butyl hypochlorite, or other suitable solvent. The 9α-halo-17β-hydroxy-17α-alkylandrostane-3,11-diones and 9α - halo - 17β - hydroxy-17α-alkyl-19-norandrostane-3,11-diones wherein the alkyl radical is preferably a lower-alkyl radical containing from two to eight carbon atoms, inclusive, e. g. ethyl, propyl, isopropyl, butyl, secondary-butyl, amyl, hexyl, heptyl, octyl, etc., and wherein the halo atom is defined as above, are prepared by the same methods and have similar androgenic, anabolic, hypotensive, anti-pituitary, central nervous system depressant, and anti-estrogen activity.

The following examples are illustrative of certain preferred products and processes and are not to be construed as limiting the invention.

Example 1.—A solution of 9α-fluoro-11β,17β-dihydroxy-17α-methyl-5β-androstane-3-one in glacial acetic acid is mixed with excess chromic anhydride ($CrO_3$) dissolved in acetic acid containing a small percentage of water. After maintaining the reaction mixture several hours at room temperature, methyl alcohol is added, the mixture is then concentrated in vacuo to a small volume, and water is added. The solid which precipitates is recovered by filtration, washed with water and dried in vacuo providing 9α-fluoro-17β-hydroxy-17α-methyl-5β-androstane-3,11-dione. Recrystallization from dilute acetone provides purified product having a melting point of 200–203 degrees centigrade, $[\alpha]_D^{24}$ of minus sixteen degrees in ethanol.

Analysis.—Calcd. for $C_{20}H_{29}FO_3$: C, 71.40; H, 8.69; F, 5.65. Found: C, 71.80; H, 8.92; F, 5.27.

Example 2.—9α-fluoro-11β,17β-dihydroxy-17α-methyl-5α-androstane-3-one is converted by chromic acid oxidation to 9α-fluoro-17β-hydroxy-17α-methyl-5α-androstane-3,11-dione following the procedure of Example 1: To a solution of 300 milligrams of sodium dichromate dihydrate in eight milliliters of acetic acid was added 320 milligrams of 9α-fluoro-11β,17β-dihydroxy-17α-methyl-5α-androstane-3-one and the mixture stirred at room temperature for ¾ hour. The mixture then was diluted with 35 milliliters of water and treated with 200 milligrams of sodium sulfite to destroy excess oxidant. The insoluble 9α - fluoro - 17β - hydroxy-17α-methyl-5α-androstane-3,11-dione which separated was recovered by filtration, washed with water and recrystallized from dilute acetone; yield 161 milligrams; melting point 210–215 degrees centigrade; $[\alpha]_D^{24}$ plus 28 degrees in ethanol.

Example 3.—Following the chromic acid oxidation procedure of Examples 1 or 2, 9α-fluoro-11β,17β-dihydroxy-17α-methyl-19-nor-5α-androstane-3-one is converted to 9α - fluoro-17β-hydroxy-17α-methyl-19-nor-5α-androstane-3,11-dione and 9α-fluoro-11β,17β-dihydroxy-17α-methyl-19-nor-5β-androstane-3-one is converted to 9α-fluoro-17β-hydroxy - 17α - methyl - 19-nor-5β-androstane-3,11-dione. Also following the procedure of Examples 1 or 2, 9α-chloro-, 9α-bromo-, and 9α-iodo-11β,17β-dihydroxy-17α-methyl-5α(and 5β)-androstane-3-one are oxidized with chromic acid in acetic acid solvent to produce 9α-chloro-, 9α-bromo-, and 9α-iodo-17β-hydroxy-17α-methyl-5α(and 5β)-androstane-3,11-dione. Likewise 9α-chloro-, 9α-bromo-, and 9α-iodo-11β,17β-dihydroxy-17α-methyl-19-nor-5α(and 5β)-androstane-3-one are oxidized to provide 9α-chloro-, 9α-bromo-, and 9α-iodo-17β-hydroxy-17α-methyl-19-nor-5α(and 5β)-androstane-3,11-dione. Other 9α-halo - 17β - hydroxy-17α-alkyl-5α(and 5β)-androstane-3,11-diones and 9α-halo-17β-hydroxy-17α-alkyl-19-nor-5α(and 5β)-androstane-3,11-diones, wherein the alkyl radical and halo atom are as defined and illustrated above, are prepared by the same procedure from corresponding 9α-halo-11β,17β-dihydroxy-17α-alkyl-5α(and 5β)-androstane-3-ones and 9α-halo-11β,17β-dihydroxy-17α-alkyl-5α(and 5β)-androstane-3-ones.

*Example 4.*—A solution of 17β-hydroxy-17α-methyl-5α-androstane-3,11-dione in dry pyridine is heated under reflux with a one- to three-molar excess of acetic anhydride for about six hours. The mixture is then cooled, slowly diluted with water while stirring, and the solid precipitate obtained removed by filtration. The solid is washed with two percent aqueous hydrochloric acid solution and with water and then dried in vacuo. Recrystallization or chromatographic separation provides purified 9α-fluoro-17β-hydroxy - 17α - methyl-5α-androstane-3,11-diones 17-acetate. In exactly the same manner 9α-fluoro-17β-hydroxy - 17α - methyl-5β-androstane-3,11-dione 17-acetate, 9α - fluoro-17β-hydroxy-17α-methyl-19-nor-5α-androstane-3,11-dione 17-acetate, and 9α-fluoro-17β-hydroxy-17α-methyl-19-nor-5β-androstane-3,11-dione 17-acetate are prepared from 9α-fluoro-17β-hydroxy-17α-methyl-5β-androstane-3,11-dione, 9α - fluoro-17β-hydroxy-17α-methyl-19-nor-5α-androstane-3,11-dione, and 9α-fluoro-17β-hydroxy - 17α - methyl-19-nor-5β-androstane-3,11-dione, respectively, and acetic anhydride. Substituting the appropriate acylating agent, i. e., the appropriate acid, acid anhydride or acid chloride, for the acetic anhydride in the foregoing procedure provides other 17-acylates of 9α-fluoro-, 9α-chloro-, 9α-bromo-, and 9α-iodo-17β-hydroxy-17α-methyl-5α(and 5β)-androstane-3,11-dione and 9α-fluoro-, 9α-chloro-, 9α-bromo-, and 9α-iodo-17β-hydroxy-17α-methyl-19-nor-5α(and 5β)-androstane-3,11-dione including the 17-formate, acetate, propionate, trimethylacetate, furoate, α- or β-cyclohexylpropionate, benzoate, phenylacetate, α- or β-cyclopentylpropionate, α- or β-phenylpropionate, methylbenzoate, α- or β-furylacrylate, valerate, methacrylate, and the like. The foregoing 17-acylates can also be prepared by oxidation, according to the procedures of Examples 1 to 3, of corresponding 17-acylates of 9α-fluoro-, 9α-chloro-, 9α-bromo-, and 9α-iodo-11β,17β-dihydroxy-17α-methyl-5α(and 5β)-androstane-3-one, and 9α-fluoro-, 9α-chloro-, 9α-bromo-, and 9α-iodo-11β,17β-dihydroxy-17α-methyl-19-nor-5α(and 5β)-androstane-3-one. The 17-acylates of other 9α-halo-17β-hydroxy-17α-alkyl-5α(and 5β)-androstane-3,11-diones and 9α-halo-17β-hydroxy-17α-alkyl-19-nor-5α(and 5β)-androstane-3,11-diones, wherein the alkyl and acylate radicals and the halo atom are as defined and illustrated above, also are prepared by the foregoing procedure.

I claim:

1. 9α - halo - 17β - hydroxy-17α-methylandrostane-3,11-dione of the formula

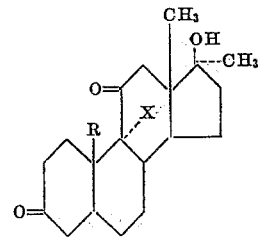

wherein R is selected from hydrogen and methyl and X is a halogen atom having an atomic weight from nineteen to 127.

2. 9α - halo - 17β - hydroxy-17α-methylandrostane-3,11-dione wherein the halo atom has an atomic weight from nineteen to 36.

3. 9α - halo-17β-hydroxy-17α-methyl-19-norandrostane-3,11-dione wherein the halo atom has an atomic weight from nineteen to 36.

4. 9α-fluoro - 17β - hydroxy-17α-methyl-5α-androstane-3,11-dione.

5. 9α - fluoro - 17β - hydroxy-17α-methyl-19-nor-5α-androstane-3,11-dione.

6. 9α - fluoro-17β-hydroxy-17α-methyl-5β-androstane-3,11-dione.

7. 9α - fluoro - 17β - hydroxy-17α-methyl-19-nor-5β-androstane-3,11-dione.

No references cited.